United States Patent
Gross et al.

(10) Patent No.: US 9,571,594 B2
(45) Date of Patent: Feb. 14, 2017

(54) ANALYZING QUALITY OF APPLICATIONS LINKED TO AN ONLINE SYSTEM

(71) Applicant: Facebook, Inc., Menlo Park, CA (US)

(72) Inventors: Jonathan J Gross, Seattle, WA (US); Yihua Liao, Fremont, CA (US); Joshua Luke Krivoshein, San Francisco, CA (US); Monika Leigh Bickert, Menlo Park, CA (US); Eugene Zarakhovsky, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/567,901

(22) Filed: Dec. 11, 2014

(65) Prior Publication Data

US 2016/0171385 A1    Jun. 16, 2016

(51) Int. Cl.
*G06Q 50/00* (2012.01)
*H04L 29/08* (2006.01)

(52) U.S. Cl.
CPC .............. *H04L 67/22* (2013.01); *G06Q 50/01* (2013.01); *H04L 67/306* (2013.01)

(58) Field of Classification Search
CPC ....................................................... G06N 5/04
See application file for complete search history.

(56) References Cited

U.S. PATENT DOCUMENTS

2013/0246521 A1* 9/2013 Schacht ................. G06Q 50/01
                                                                 709/204
2014/0317184 A1* 10/2014 Weaver .................. H04L 67/22
                                                                 709/204

* cited by examiner

*Primary Examiner* — Stanley K Hill
*Assistant Examiner* — Ola Olude Afolabi
(74) *Attorney, Agent, or Firm* — Fenwick & West LLP

(57) ABSTRACT

An online system extracts features from an application linked to the online system. The application is used by users of the online system and posts content to the online system. A trained model is applied to the extracted features to generate a quality score for the application. The trained model is trained using features extracted from a set of training applications and quality scores manually assigned to the training applications, wherein the manually assigned quality scores indicate whether each training application satisfies a set of criteria and the generated quality score represents a probability of the application satisfying the set of criteria. Based on the quality score, content provided by the application is ranked for presentation to a user of the online system in relation to other content of the online system. The online system presents the content provided by the application to the user according to the ranking.

16 Claims, 2 Drawing Sheets

ANALYZING QUALITY OF APPLICATIONS LINKED TO AN ONLINE SYSTEM

BACKGROUND

This disclosure relates generally to applications linked to online systems, and in particular to determining quality of the applications and presenting content associated with the applications to users of the online system according to the quality of the applications.

Application providers often integrate their applications with larger online systems to leverage information of the online system and increase visibility of the application. Integration with an online system may also enable the application to provide additional services or functions that are not available in the application alone. The online systems benefit from the integrated applications, as the applications may increase user traffic to the online systems and improve user engagement with the online system.

Users of the online system are more likely to engage with high-quality content in the online system than low-quality content. To improve the likelihood that a user will find high-quality content associated with applications and continue to engage with both the online system and the applications integrated with the online system, it is beneficial for the online system to verify that an application has a sufficiently high quality before allowing the application to post content to the online system.

SUMMARY

An online system, such as a social networking system, generates quality scores for applications linked to the online system to present content associated with high-quality applications to users of the online system. Applications linked to the online system are used by users of the online system and post content to the online system, such as content identifying actions taken by the users when using the applications. To generate a quality score for an application linked to the online system, the online system extracts features from the application. A trained model is applied to the extracted features, which assigns a quality score to the application.

To obtain the trained model, the online system receives quality scores manually assigned to a training set of applications by human reviewers. The human reviewers assign the quality scores to the applications by rating the applications across a plurality of dimensions defining criteria for a quality application. For example, the reviewers rate the applications according to navigability, non-triviality, novelty, and quality of content generated by the applications. The online system trains the model using features extracted from the training applications and the manually assigned quality scores to predict a probability of an application satisfying the quality criteria. In one embodiment, the manually assigned quality scores are binary and indicate whether an application satisfies all of the quality criteria. In this case, the quality score generated by applying the trained model to features extracted from an application represents a probability that the application satisfies all of the quality criteria. The trained model may alternatively predict for each dimension a probability of the application satisfying the criteria associated with the dimension, and generate a quality score for the application based on the determined probabilities.

The online system uses the quality score to rank content provided by the application in relation to other content of the online system for presentation to a user of the online system. The content provided by the application is presented to the user according to the ranking. In one embodiment, the online system presents application content to the user as one or more stories in a newsfeed. The position of the application content in the newsfeed may depend on the quality score of the application. For example, if an application has a quality score below a threshold, the online system presents content associated with the application at a lower frequency in the newsfeed or at a lower position in the newsfeed than other content of the online system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
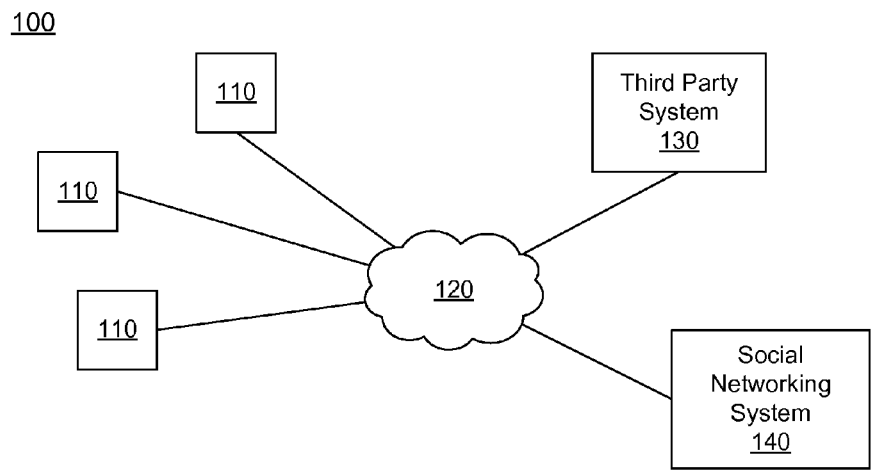
FIG. 1 is a block diagram of a system environment in which a social networking system operates, according to one embodiment.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
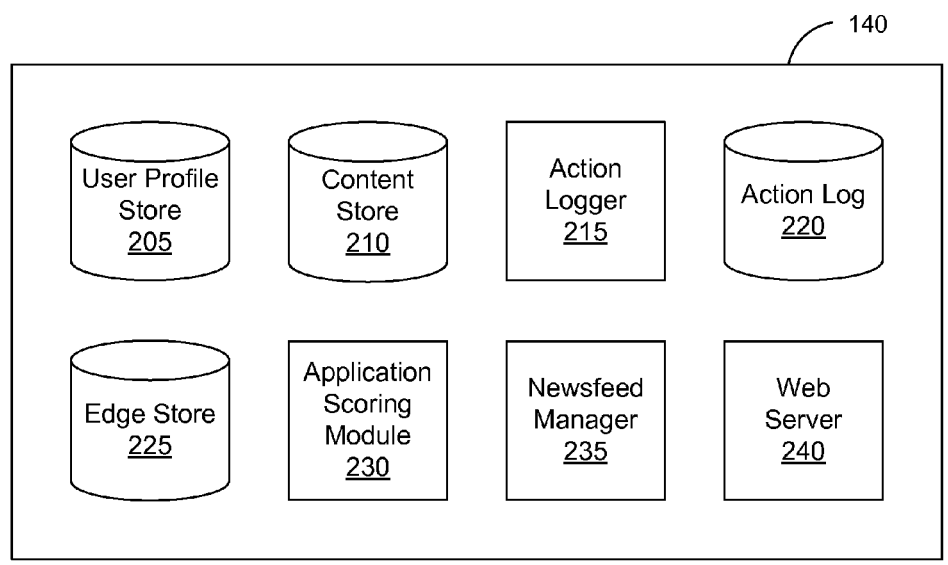
FIG. 2 is a block diagram of a social networking system, according to one embodiment.

FIG. 2 is an example block diagram of an architecture of the social networking system 140. The social networking system 140 shown in FIG. 2 includes a user profile store 205, a content store 210, an action logger 215, an action log 220, an edge store 225, an application scoring module 230, a newsfeed manager 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140.

In one embodiment, the content store 210 also stores recommendation units. The social networking system 140 provides one or more recommendation units to its users to increase user interaction with the social networking system. A recommendation unit suggests one or more actions a user viewing the recommendation unit (a "viewing user") to increase the viewing user's interaction with the social networking system 140. For example, a recommendation unit provides a suggestion for the viewing user to establish a connection with another user as well as a link enabling the user to do so. In other examples, a recommendation unit encourages the viewing user to invite a friend to an event, identify a friend in a photo, join a group, begin using an application, or perform another suitable action with the social networking system. Each recommendation unit is associated with a score based on a value of the viewing user interacting with the recommendation unit (i.e., "converting" the recommendation unit by performing the recommended action) and/or on the likelihood that the viewing user will convert the recommendation unit. The score may be based on prior interaction with recommendation units by the viewing user, other users to whom the viewing user is connected, a probability of the viewing user interacting with the recommendation unit, or other criteria. Determination of a score for a recommendation unit is further described in U.S. patent application Ser. No. 13/549,080, filed on Jul. 13, 2012, which is hereby incorporated by reference in its entirety. The social networking system 140 selects one or more recommendation units to send to a user based at least in part on this score.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, applications provided by the social networking system 140 or the third party systems 130 are made available to users through the social networking system 140. The applications may use information in the user profile store 205, the action log 220, and the edge store 225 to provide a service or functionality to a user of the social networking system 140. For example, an application is software that can be installed on a user's client device 110 and uses data from the social networking system 140 to provide a service or functionality to the user. Other applications are web-based applications made available to the users of the social networking system 140 over the network 120. To use some or all of the functions provided by the application, the user may explicitly grant the application access to data of the social networking system 140. The applications may also post content to the social networking system 140 describing actions performed by users of the social networking system 140 in relation to the applications. In some cases, applications may operate independently of the social networking system 140 but provide additional functionality to users who allow the application access to the users' respective user profiles or other data stored at the social networking system 140. For example, providing an application with access to a user profile enables the user to share content from the application with the user's connections via the social networking system 140.

The application scoring module 230 analyzes quality of applications linked to the social networking system 140. To assess the quality of an application, the application scoring module 230 extracts features from the application such as user feedback on the application, number of users who viewed information about the application, number of users who granted permissions to the application to access data from the social networking system 140, profit value of the application, and any information provided by the developer of the application (e.g., a configuration of the application). A subset of the applications linked to the social networking system 140 are selected as a training set of applications, and quality scores are manually assigned to the applications in the training set.

Using features extracted from the applications in the training set and the manually-assigned quality scores, the application scoring module 230 trains a model for assigning quality scores to applications linked to the social networking system 140. The trained model is then applied to features extracted from other applications linked to the social networking system 140 to assign quality scores to the other applications. In one embodiment, the application scoring module 230 uses the quality score to rank content associated with the applications in relation to other content of the social networking system 140, including content posted by other applications and content posted by users of the social networking system 140. By ranking the application content relative to other content, the application scoring module 230 enables the social networking system 140 to select content associated with high-quality applications for presentation to a user. The application scoring module 230 or other modules of the social networking system 140 may alternatively use the quality scores of applications to select applications to recommend to users of the social networking system 140, select applications to appear in an application center or store featured in the social networking system 140, or flag applications for policy compliance review. For example, if an application has a quality score below a specified threshold, the application is flagged as being likely to violate one or more policies of the social networking system 140 and is sent to a policy compliance reviewer.

In one embodiment, the social networking system 140 identifies stories likely to be of interest to a user through a "newsfeed" presented to the user. A story presented to a user describes an action taken by an additional user connected to the user and identifies the additional user. For example, some stories presented to users of the social networking system 140 describe an action taken by an additional user using a third party application. In some embodiments, a story describing an action performed by a user may be accessible to users not connected to the user that performed the action. The newsfeed manager 235 may generate stories for presentation to a user based on information in the action log 220 and in edge store 225 or may select candidate stories included in content store 210. One or more of the candidate stories are selected and presented to a user by the newsfeed manager 235.

For example, the newsfeed manager 235 receives a request to present one or more stories to a social networking system user. The newsfeed manager 235 accesses one or more of the user profile store 105, the content store 110, the action log 120, and the edge store 130 to retrieve information about the identified user. For example, stories or other data associated with users connected to the identified user are retrieved. The retrieved stories or other data is analyzed by the newsfeed manager 235 to identify content likely to be relevant to the identified user. For example, stories associated with users not connected to the identified user or stories associated with users for which the identified user has less than a threshold affinity are discarded as candidate stories. Based on various criteria, the newsfeed manager 235 selects one or more of the candidate stories for presentation to the identified user.

In various embodiments, the newsfeed manager 235 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 205. The newsfeed manager 235 may also determine the order in which selected stories are presented via the newsfeed. For example, the newsfeed manager 235 determines that a user has a highest affinity for a specific user and increases the number of stories in the newsfeed associated with the specific user or modifies the positions in the newsfeed where stories associated with the specific user are presented.

The newsfeed manager 235 may also account for actions by a user indicating a preference for types of stories and selects stories having the same, or similar, types for inclusion in the newsfeed. Additionally, newsfeed manager 235 may analyze stories received by social networking system 120 from various users and obtains information about user preferences or actions from the analyzed stories. This information may be used to refine subsequent selection of stories for newsfeeds presented to various users.

In one embodiment, the newsfeed manager 235 uses quality scores of applications linked to the social networking system 140 to select stories associated with the applications for inclusion in the newsfeed. For example, if the quality score of an application is below a specified threshold value, the newsfeed manager 235 presents a story associated with the application at a lower position in the newsfeed than stories associated with other content of the social networking system 140. As another example, the newsfeed manager 235 selects stories associated with an application having a below-threshold quality score less frequently than stories associated with other content of the social networking system 140 for inclusion in the newsfeed.

The web server 240 links the social networking system 140 via the network 120 to the one or more client devices 110, as well as to the one or more third party systems 130. The web server 140 serves web pages, as well as other web-related content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or RIM®.

Presenting Application Content According to Quality Score

Figure 3:
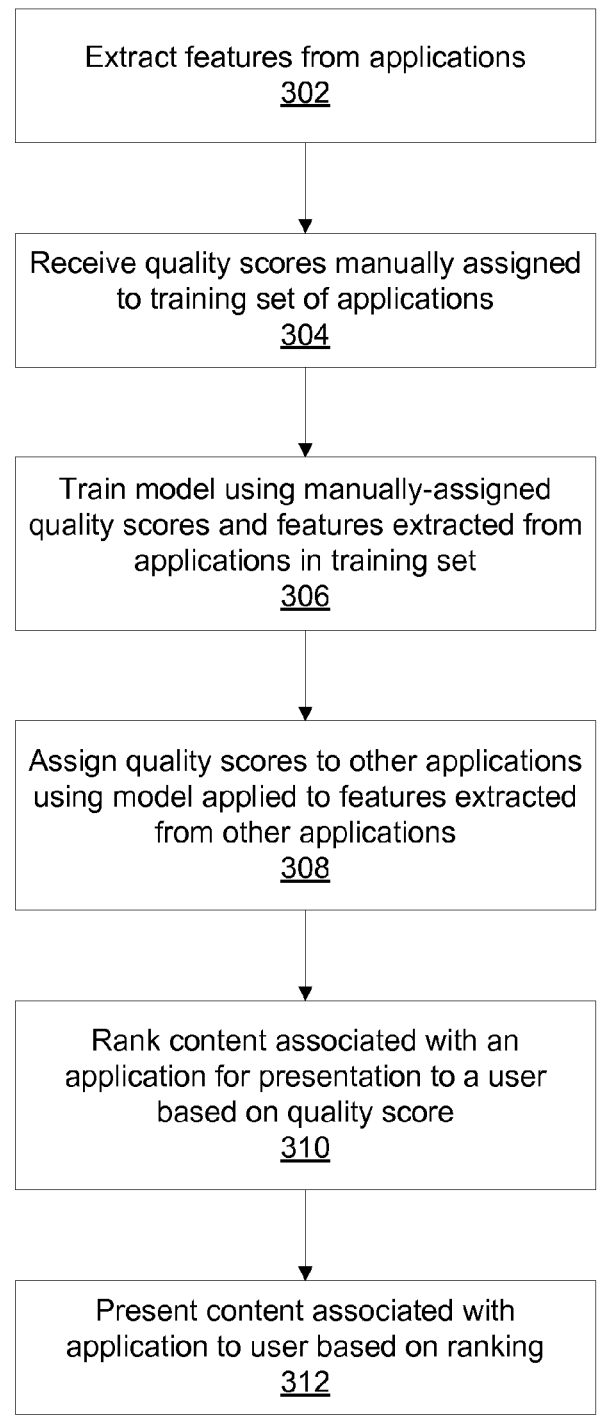
FIG. 3 is a flowchart illustrating a process for presenting application content to users of a social networking system according to quality of the applications, according to one embodiment.

FIG. 3 is a flowchart illustrating a process for presenting application content according to application quality, according to one embodiment. The process shown in FIG. 3 is performed by the social networking system 140, though in other embodiments the process may be performed by other online systems. Other embodiments of the process may include additional, fewer, or different steps, and the steps may be performed in different orders. The social networking system 140 performs the process shown in FIG. 3 to assign quality scores to applications linked to the social networking system 140, such as applications using content of the social networking system 140 and posting content to the social networking system 140. Furthermore, in one embodiment, the process is performed to assign quality scores to applications meeting one or more eligibility criteria, such as a threshold number of active users of the application or a threshold number of installations of the application.

The social networking system 140 extracts 302 features from the applications linked to the social networking system 140. In one embodiment, the features extracted from an application include usage and response to the application from the users of the application or the social networking system 140 users, a business value of the application, and a configuration of the application. For example, the social networking system 140 extracts explicit feedback provided by users of the application, such as a star rating of the application, and implicit user feedback, such as a number of users who viewed information about the application and a number of users who installed the application or granted permission to the application. As an example business value feature, the social networking system 140 determines a profit value of the application. Example configuration features of an application include the number of platforms supported by the application and a layout of the application. The business value and configuration features of an application may be provided by the developer of the application, or the social networking system 140 may retrieve the features from one or more external sources.

The social networking system 140 receives 304 quality scores manually assigned to a training set of applications. The training set of applications includes a random sample of applications associated with the social networking system 140 or a random sample of applications meeting the eligibility criteria. In one embodiment, the manually-assigned quality scores are scores of 1 or 0, and are assigned to the applications in the training set by human reviewers rating the applications across a plurality of dimensions defining criteria for a quality application. For example, a score of 1 indicates an application meets all of the criteria for a quality application and a score of 0 indicates the application does not meet one or more of the criteria. The quality scores assigned to the applications in the training set may alternatively have different values than 1 and 0, and the applications may not be scored on a binary scale. For example, the training applications may be assigned separate scores for each dimension over which the applications are evaluated. Example dimensions over which the training set of applications are evaluated include navigability (e.g., does the application have an intuitive layout?), non-triviality (e.g., does the application provide a useful and stable functionality?), and novelty of the application, as well as quality of the content posted by the application to the social networking system 140.

The social networking system 140 trains 306 a model using the manually-assigned quality scores and features extracted from the applications in the training set. In one embodiment, the model uses features extracted from an application to assign a score to the application, where the score represents a probability of the application satisfying the quality criteria for the applications linked to the social networking system 140. In one embodiment, the model is trained 306 to generate a single score representing the probability of an application satisfying all of the quality criteria. However, other embodiments of the social networking system 140 train 306 the model to predict distinct probabilities of the application satisfying each of several quality criteria, and generate the quality score for the application based on the probabilities. For example, the social networking system 140 may train a model for each dimension across which the training applications were evaluated. In one embodiment, the model assigns the scores based on a degree of similarity of the features to the feature of the training applications assigned a score of 0 or the features of the training applications assigned a score of 1. For example, the model assigns a score to a test application using cosine similarity between the features of the test application and the features of the training applications assigned a score of 1 to represent the probability of the test application satisfying the quality criteria. In another embodiment, the model classifies an application as either a high-quality application (e.g., receiving a score of 1) or a low-quality application (e.g., receiving a score of 0) depending on whether the features extracted from the application are more similar to the features of the training applications assigned a score of 1 or the features of the training applications assigned a score of 0. The social networking system 140 applies the model to the features extracted from applications associated with the social networking system 140 to assign 308 quality scores to the applications.

Based on the quality scores assigned to the applications, the social networking system 140 ranks 310 content associated with the applications for presentation to a user of the social networking system 140. Content associated with an application may include any of a variety of types of content items presented to users via the social networking system 140, including notifying a user or connections of the user of actions taken by the user in relation to the application, notifying a user of the application of changes to the application or special promotions related to the application, and recommendation units generated by the social networking system 140 to recommend the application to users of the social networking system 140. In one embodiment, the social networking system 140 ranks content associated with an application in relation to other content in the social networking system 140. For example, if an application has a low quality score (e.g., zero or close to zero), the social networking system 140 applies a penalty to the content associated with the application such that other content in the social networking system 140 will be presented to a user before the application content is presented to the user. In another embodiment, the social networking system 140 ranks content associated with a first application relative to content associated with each of a plurality of other applications. For example, if the first application is assigned a lower quality score than the other applications, the content associated with the first application is ranked lower than the content associated with the other applications and is therefore presented to a user of the social networking system 140 after the content associated with the other applications is presented.

The social networking system 140 uses the ranking of content associated with an application to present 312 the application content to a user of the social networking system 140. In one embodiment, the social networking system 140 presents application content to a user as stories in a newsfeed. The stories containing application content may be selected or presented to a user in an ordering determined based on the ranking of the application content. For example, higher-ranked application content is more likely to be included in a newsfeed of a user than lower-ranked application content. Similarly, higher-ranked application content may appear higher in a user's newsfeed than lower-ranked application content.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    extracting features from an application of a plurality of applications linked to an online system, the plurality of applications operate independently of and external to the online system, are used by users of the online system, and are configured to post content to the online system;
    applying a trained model to the extracted features of the application to generate a quality score for the application, the trained model is trained by:
        identifying a set of features from a set of training applications from the plurality of applications, and
        manually assigning quality scores to each of the set of features from the set of training applications, the manually assigned quality scores indicating whether each training application satisfies one or more of a set of criteria, and
        the trained model generates the quality score for the application based on the quality scores assigned to the set of features of the set of training applications, the generated quality score representing a probability of the application satisfying the set of criteria;
    ranking for presentation to a user of the online system, content provided by the application in relation to other content of the online system based on the generated quality score; and
    presenting the content provided by the application to the user of the online system according to the ranking.

2. The method of claim 1, wherein ranking the content provided by the application in relation to other content of the online system comprises:
    generating a quality score for each of a plurality of other applications linked to the online system; and
    ranking the content provided by the application in relation to content provided by the plurality of other applications based on the quality score of the application and the quality scores of each of the plurality of other applications.

3. The method of claim 1, wherein presenting the content provided by the application comprises:
    presenting the content to the user as one or more stories in a newsfeed.

4. The method of claim 3, wherein presenting the content as one or more stories in the newsfeed comprises:
    responsive to the quality score being below a threshold, presenting the one or more stories at a lower position in the newsfeed than stories associated with the other content of the online system.

5. The method of claim 3, wherein presenting the content as one or more stories in the newsfeed comprises:
    responsive to the quality score being below a threshold, presenting the one or more stories less frequently in the newsfeed than stories associated with the other content of the online system.

6. The method of claim 1, wherein the extracted features comprise one or more of user feedback on the application, usage of the application, business value of the application, and configuration of the application.

7. The method of claim 1, wherein the generated quality score represents a quality of the application and a quality of the content posted by the application to the online system.

8. The method of claim 1, wherein the manually assigned quality scores are binary scores assigned to the applications in the training set, and wherein a high quality score is assigned to a training application satisfying the set of criteria and a low quality score is assigned to a training application not satisfying one or more of the criteria.

9. A computer program product comprising a non-transitory computer-readable storage medium containing computer program code for:

extracting features from an application linked to an online system, the application used by users of the online system and configured to post content to the online system, the application operating independently of and external to the online system;

applying a trained model to the extracted features of the application to generate a quality score for the application, the trained model is trained by identifying features extracted from a set of training applications, quality scores are manually assigned to each of the set of training applications, the manually assigned quality scores indicating whether each training application satisfies a set of criteria, the trained model generates the quality score for the application based on the quality scores assigned to the set of features of the set of training applications, and the generated quality score representing a probability of the application satisfying the set of criteria;

ranking for presentation to a user of the online system, content provided by the application in relation to other content of the online system based on the generated quality score; and presenting the content provided by the application to the user of the online system according to the ranking.

10. The computer program product of claim 9, wherein ranking the content provided by the application in relation to other content of the online system comprises:

generating a quality score for each of a plurality of other applications linked to the online system; and ranking the content provided by the application in relation to content provided by the plurality of other applications based on the quality score of the application and the quality scores of each of the plurality of other applications.

11. The computer program product of claim 9, wherein presenting the content provided by the application comprises:

presenting the content to the user as one or more stories in a newsfeed.

12. The computer program product of claim 11, wherein presenting the content as one or more stories in the newsfeed comprises:

responsive to the quality score being below a threshold, presenting the one or more stories at a lower position in the newsfeed than stories associated with the other content of the online system.

13. The computer program product of claim 11, wherein presenting the content as one or more stories in the newsfeed comprises:

responsive to the quality score being below a threshold, presenting the one or more stories less frequently in the newsfeed than stories associated with the other content of the online system.

14. The computer program product of claim 9, wherein the extracted features comprise one or more of user feedback on the application, usage of the application, business value of the application, and configuration of the application.

15. The computer program product of claim 9, wherein the generated quality score represents a quality of the application and a quality of the content posted by the application to the online system.

16. The computer program product of claim 9, wherein the manually assigned quality scores are binary scores assigned to the applications in the training set, and wherein a high quality score is assigned to a training application satisfying the set of criteria and a low quality score is assigned to a training application not satisfying one or more of the criteria.

* * * * *